Nov. 3, 1931.  V. G. APPLE  1,830,458

STATOR WITH INSULATION INCLOSED WINDING

Filed Aug. 18, 1930   3 Sheets-Sheet 1

INVENTOR

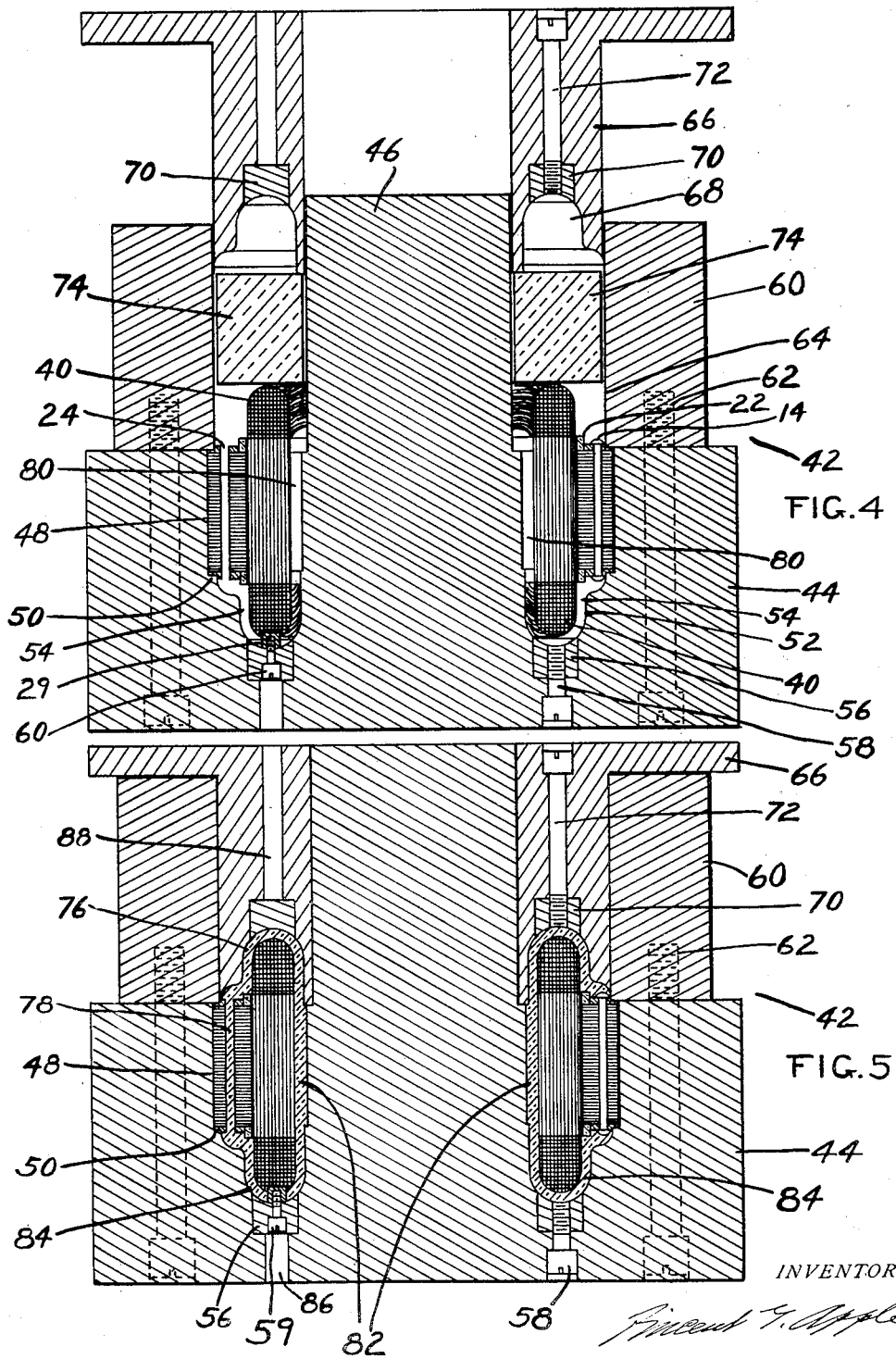

Nov. 3, 1931.  V. G. APPLE  1,830,458

STATOR WITH INSULATION INCLOSED WINDING

Filed Aug. 18, 1930  3 Sheets-Sheet 3

INVENTOR

Vincent G. Apple

Patented Nov. 3, 1931

1,830,458

UNITED STATES PATENT OFFICE

VINCENT G. APPLE, OF DAYTON, OHIO  REISSUED

STATOR WITH INSULATION INCLOSED WINDING

Application filed August 18, 1930. Serial No. 475,882.

This invention relates to dynamo electric machine stators and has special reference to stators in which the winding is completely inclosed in a mass of insulation.

The object of the invention is to provide a stator for a dynamo electric machine which will be particularly adapted to situations where the windings are subject to the action of oil, moisture and acids, as in a motor employed in mechanical refrigerating mechanisms where the windings of conventional motors are extremely short lived.

I attain this object in the structure hereinafter described and illustrated in the accompanying drawings wherein, Fig. 1 is a perspective view of a stator core with the windings in place.

Fig. 4 shows the wound structure in the mold ready to have the jacket insulation molded thereabout.

Fig. 5 shows the mold closed and the insulation jacket formed about the windings.

Similar numerals refer to similar parts throughout the several views.

Figure 1:
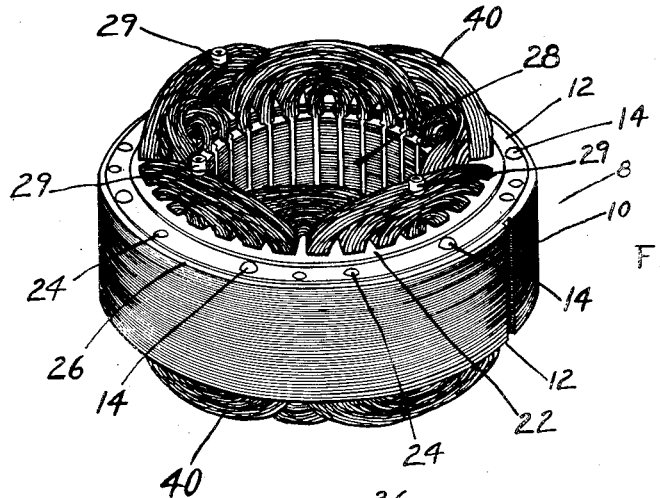

The core 8 is made up of a plurality of thin laminæ 10, with heavier metal rings 12 at the ends, all held together by rivets 14. The winding slots 16, separated by teeth 18 (see Fig. 3), are lined with fish paper or similar insulation 20. Heavy laminæ 22 of insulation cover the ends of the core where the coils emerge from the slots (see Fig. 1). Midway between the rivets 14 a series of openings 24 extend lengthwise entirely through the core. These holes 24 are afterward permitted to fill with insulation. The heavy metal rings 12 have rabbets 26 turned into the corners after the core is assembled.

The rabbets 26 are concentric with the central opening 28 of the core.

In the winding I employ insulated magnet wire preferably of the kind having a cotton or other fibrous covering, in order that a heavier layer of insulation may be gotten between the individual turns. This is preferably accomplished by saturating the fibrous covering on the wire with fluid insulation before it is wound into the coils, and a convenient method of so treating the wire is shown and described in my copending application Serial No. 356,586, filed April 19th, 1929. Of course the older method of first winding the coils on the core, then impregnating them with a thin liquid insulation which is afterward hardened, may be pursued when the subsequent molding pressure is not too great. The tapped metal terminals 29 are secured to the ends of the winding as shown.

Figure 2:
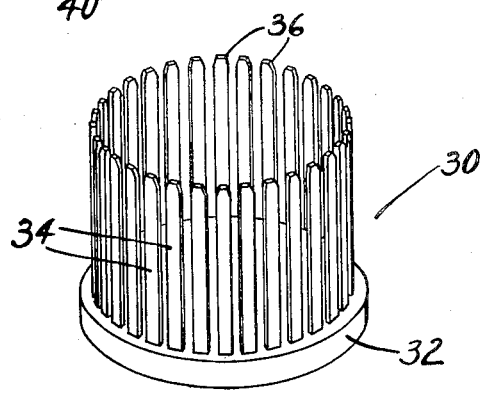
Fig. 2 is a perspective view of a tool employed to keep the coils against the bottoms of the winding slots until the coils are hardened.
Figure 3:
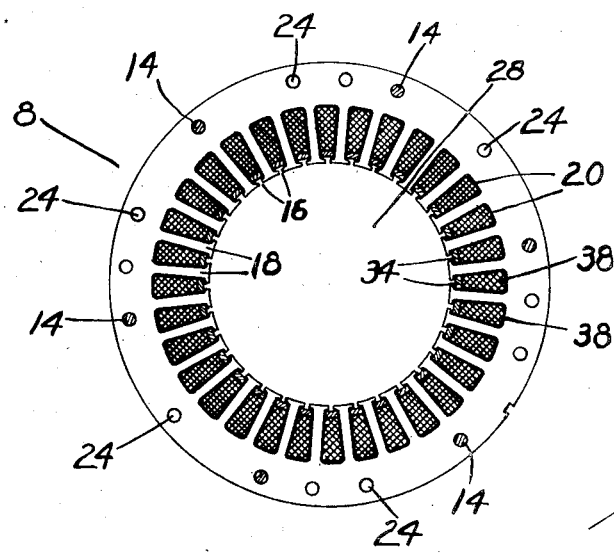
Fig. 3 is a transverse section through the wound structure with the tool Fig. 2 inserted, in which condition the coils are hardened.

Before the impregnating fluid in the winding is hardened the tool 30 shown in Fig. 2 is preferably inserted. Tool 30 comprises a base plate 32 with a series of rectangular pins 34, slightly tapered at the free ends as at 36 to facilitate insertion. The pins 34 occupy the unfilled portion at the open sides of the slots. The section Fig. 3 shows the pins 34 holding the coil sides 38 to the bottoms of the winding slots 16. With tool 30 inserted as here shown the impregnating fluid is hardened. After the winding is rigid the tool 30 is withdrawn.

In the illustrative embodiment shown in the drawings, the winding is of the two-phase, four-pole distributed type, wherein the coil sides 38, Fig. 3, do not entirely fill the slots, and the coil heads 40, Fig. 1, form substantially continuous rings at the ends of the core. It is an important part of the invention to add to the structure Fig. 1 a complete seal for the winding composed of one of the acid-proof thermo plastic insulating compounds which will extend not only around the coil heads 40, Fig. 1, at the ends of the core but which will cover the coil sides 38, Fig. 3, where they extend through the slots 16 and extend around the outside of the coil heads 40 and through the openings 24, forming an impervious jacket around the entire winding.

To facilitate the forming of the jacket around the winding, the mold 42, Figs. 4 and 5, is provided. Mold 42 comprises a base 44 having an upwardly extending center plug 46. The base is hollowed out at 48 to fit the core 8, the shoulder 50 of the mold being fitted to the rabbet 26 of the core. The center plug 46 at its lower end is fitted to the central opening 28 of the core, the upper end being somewhat smaller in diameter. Below the core 8 the base 44 is hollowed out as at 52 to clear the coil head 40 by a substantial margin leaving an annular space 54 between the coil head 40 and the mold. A stripper ring 56 lies in a circular groove in the bottom of the base 44 and is held there by screws 58. Other screws 59 extend through ring 56 into terminals 29.

The stock ring 60 is secured to the top of base 44 by screws 62, and has a central opening 64 of a diameter to fit a rabbet 26 at the upper end of the core. When stock ring 60 is secured to the base 44 the core 8 is held against both upward and downward movement.

The hollow plunger 66 fits over the center plug 46 and into the stock ring 60. Plunger 66 is hollowed out at the lower end as at 68 to correspond to the annular opening 54 in the base. Another stripper ring 70 fits into a circular groove in the lower end of plunger 66 and is held there by screws 72.

After a core has been wound and insulation treated as described relative to Fig. 1 and the tool 30, Fig. 2, has been inserted as in Fig. 3 and the insulation has been hardened and the tool removed the wound structure is placed in the mold 42 as in Fig. 4, an annular slug 74 of insulation placed under plunger 66, fluxed and compressed about the coils by pressing plunger 66 downward to the position shown in Fig. 5 whereby the insulation is formed in a ring around the upper coil head 40, Fig. 4, as at 76, Fig. 5, through the openings 24, Fig. 4, as at 78, Fig. 5, and through the openings 80, Fig. 4, left when the pins 34 of tool 30 are withdrawn, as at 82, Fig. 5, into the annular space 54 of the base, Fig. 4, as at 84, Fig. 5.

In this condition the insulation is hardened and when sufficiently hard the screws 58 and 62 are removed, the mold inverted, held by the base 44, and the stripper ring 56 is pushed out by pushing through holes 86. The screws 59 are then removed. The mold is then turned over, held by the plunger 66 and after removing screws 72 the stripper ring 70 is pushed out, by pushing through holes 88, whereupon the finished stator appears as at 90, Fig. 6.

Figure 6:
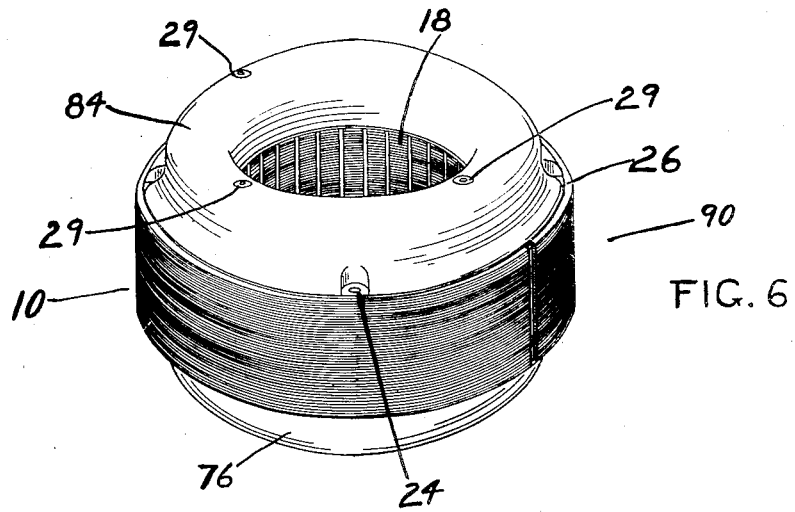
Fig. 6 is an elevation of the completed stator.
Figure 7:
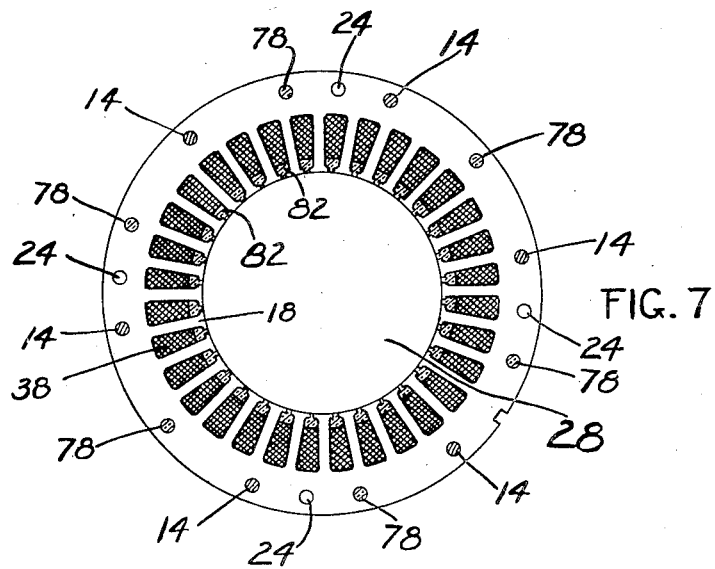
Fig. 7 is a transverse section through the completed stator shown in Fig. 6.

Fig. 7 is a section transverse to the axis taken through the completed stator 88 and from a consideration of the views Figs. 6 and 7 it may be seen that the entire winding, including the coil heads at the end of the core and the coil sides within the core slots, is enclosed in the insulation mass with only the surfaces of the core teeth exposed at the inner diameter of the stator, and the surfaces of the core laminæ, together with the rabbeted end rings at the outer diameter of the stator. Four of the openings 24 are free of insulation so that bolts may pass through to secure bearing heads if desired. The three terminals 29 are also exposed at the surface of the insulation for connection to the line wires. It will also be apparent that the insulation rings 76 and 84 are tied together by the integral struts of insulation 78 and 82 which extend endwise through the core from one ring to the other.

Having described my invention, I claim:

1. An alternating current stator comprising, a laminated core having a central rotor opening and a plurality of winding slots extending radially outward from said opening, a winding comprising coils of insulated wire, the coil sides partly filling the said slots, coil heads formed of the end turns of said coils at the ends of the core, and an impervious mass of acid-proof thermo plastic insulation comprising, in a single piece, a ring at each end of the core, struts of the same material, connecting said rings, extending through the unfilled parts of the winding slots, said rings penetrating, surrounding and enclosing the said coil heads, and said struts penetrating and covering said coil sides.

2. An alternating current stator comprising, a laminated core having a central rotor opening, a plurality of winding slots surrounding said opening, and a row of holes extending lengthwise through the yoke portion farther from the central opening than said slots, a winding on said core comprising coils of insulated wire, the coil sides partly filling the said slots, coil heads formed of the end turns of said coils at the ends of the core, and an impervious mass of acid-proof thermo plastic insulation comprising, in a single piece, a ring at each end of the core, rods of the same material extending through the said holes and joining said rings, and struts of the same material extending through the unfilled portions of the said slots, said rings penetrating, surrounding and enclosing the said coil heads, and said struts penetrating and covering said coil sides.

3. An alternating current stator comprising, a laminated core having a central rotor opening, with winding slots surrounding said opening, rivets extending lengthwise through the yoke of said core holding the laminæ together, said yoke having holes lengthwise therethrough between the said rivets, coil sides partly filling said winding slots, coil heads formed of the end turns of the coils at the ends of the core, and an impervious mass of acid-proof thermo plastic insulation comprising, in a single piece, a ring at each end of the core penetrating and covering said coil heads, struts of the same material extending through the unfilled part of the winding slots joining said rings and penetrating and covering said coil sides, flanges extending outwardly from said rings covering said rivets, and rods of the same material connecting the said flanges through the said holes.

In testimony whereof I affix my signature.
VINCENT G. APPLE.